US010548028B2

(12) United States Patent
Patwardhan et al.

(10) Patent No.: US 10,548,028 B2
(45) Date of Patent: Jan. 28, 2020

(54) ESTABLISHING BACKHAUL CONNECTION TO MESH POINTS AND MESH PORTALS ON DIFFERENT WIRELESS COMMUNICATION CHANNELS

(71) Applicant: Hewlett Packard Enterprise Development LP, Houston, TX (US)

(72) Inventors: Gaurav Patwardhan, Santa Clara, CA (US); Aidan Doyle, Santa Clara, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 15/885,252

(22) Filed: Jan. 31, 2018

(65) Prior Publication Data

US 2019/0239096 A1  Aug. 1, 2019

(51) Int. Cl.
| | | |
|---|---|---|
| H04W 24/02 | (2009.01) | |
| H04W 88/06 | (2009.01) | |
| H04W 48/16 | (2009.01) | |
| H04W 88/10 | (2009.01) | |
| H04W 92/20 | (2009.01) | |
| H04W 84/10 | (2009.01) | |

(52) U.S. Cl.
CPC ........... *H04W 24/02* (2013.01); *H04W 48/16* (2013.01); *H04W 88/06* (2013.01); *H04W 88/10* (2013.01); *H04W 84/10* (2013.01); *H04W 92/20* (2013.01)

(58) Field of Classification Search
CPC ..... H04W 24/02; H04W 48/16; H04W 88/06; H04W 88/10; H04W 84/10; H04W 92/20; H04W 84/04; H04W 28/085
See application file for complete search history.

(56) References Cited

U.S. PATENT DOCUMENTS

| | | | |
|---|---|---|---|
| 9,271,153 B2* | 2/2016 | Ho | H04W 16/10 |
| 9,325,468 B2 | 4/2016 | Mitola | |
| 2007/0242602 A1* | 10/2007 | Pang | H04L 12/462 |
| | | | 370/216 |
| 2008/0025208 A1 | 1/2008 | Chan | |
| 2013/0156016 A1 | 6/2013 | Debnath et al. | |
| 2014/0254471 A1* | 9/2014 | Fang | H04W 84/047 |
| | | | 370/315 |
| 2017/0055159 A1 | 2/2017 | Boppana et al. | |
| 2017/0303165 A1* | 10/2017 | Adams | H04L 43/16 |
| 2018/0103505 A1* | 4/2018 | Amini | H04W 28/04 |

OTHER PUBLICATIONS

Chen, B. et al., Flexradio: Fully Flexible Radios and Networks, (Research Paper), May 4-6, 2015, 15 Pgs.

* cited by examiner

*Primary Examiner* — Kibrom T Hailu
(74) *Attorney, Agent, or Firm* — Hewlett Packard Enterprise Patent Department (57) ABSTRACT

Example method includes: detecting, by a network device, a first wireless communication channel in a first wireless band that a mesh portal node communicates on; establishing, by the network device, a first backhaul connection to the mesh portal node with a first radio of a mesh point node using the first wireless communication channel in the first wireless frequency band; assigning, by the network device, a second and different radio to communicate on a second and different wireless communication channel in the first wireless frequency band; and establishing, by the network device, a second backhaul connection to another mesh point node with the second and radio on the second wireless communication channel.

17 Claims, 4 Drawing Sheets

ESTABLISHING BACKHAUL CONNECTION TO MESH POINTS AND MESH PORTALS ON DIFFERENT WIRELESS COMMUNICATION CHANNELS

BACKGROUND

When wireless access points (APs) implement a mesh network topology, the APs often use one wireless communication band (e.g., 5 GHz band) for transmitting wireless backhaul traffic between the APs and another wireless communication band (e.g., 2.4GHz band) for transmitting client traffic for clients associated to those APs. Such configuration can be inefficient because the radios used for backhaul transmissions (e.g., 5 GHz radios) from every AP in the mesh network operate on the same single communication channel, despite that multiple communication channels within the backhaul wireless communication band are available. Moreover, such configuration provides no redundant links in the event of a backhaul link failure.

BRIEF DESCRIPTION OF THE DRAWINGS

The following detailed description references the drawings, wherein.

DETAILED DESCRIPTION

A flex-radio architecture may refer to a flexible radio assignment, in which a radio can be configured in one band (2.4 GHz or 5 GHz) with all the radio chains, or the radio chains can be split into two bands (2.4 GHz and 5 GHz). In other words, dual radios in an access point (AP) can be dynamically switched from 2.4 GHz/5 GHz to 5 GHz/5 GHz and vice versa. The access point performs this function while still monitoring the network for security threats and radio frequency (RF) interferences that may affect performance.

An example of a flex-radio architecture compliant with IEEE 802.11ac standard may have three different modes of operation as shown in Table 1 below.

TABLE 1

| Configuration | Number of spatial streams on 2.4 GHz | Number of spatial streams on 5 GHz |
| --- | --- | --- |
| 2.4 GHz only | 2 × 2 | N/A |
| 2.4 GHz and 5 GHz | 1 × 1 | 1 × 1 |
| 5 GHz only | N/A | 1 × 1 |

In the first flex-radio operating mode (e.g., dual 2.4 GHz mode), a 2×2 radio is configured to operate on the 2.4 GHz wireless communication band only. In the second flex-radio operating mode, a 2×2 radio can serve its client devices on both 2.4 GHz and 5 GHz wireless communication bands. In the third flex-radio operating mode (e.g., dual 5 GHz mode), a 2×2 radio can be configured to operate on the 5 GHz wireless communication band. Therefore, there is a lot of flexibility with respect to wireless communication band configuration and channel assignment with the AP.

Moreover, an AP may have multiple flex-radios, and each flex-radio can be independently configured to operate in one of the multiple modes. For example, Table 2 below shows three ways in which an AP with two different radios can be configured using the flex-radio technology.

TABLE 2

| Radio Configuration | Radio 1 (R1) | Radio 2 (R2) |
| --- | --- | --- |
| Simple AP | 2.4 GHz only | 5 GHz only |
| AP with 1 flex-radio | 2.4 GHz and 5 GHz | 5 GHz only |
| AP with 2 flex-radios | 2.4 GHz and 5 GHz | 2.4 GHz and 5 GHz |

The first configuration shows a simple AP without any flex-radio capabilities. The second configuration shows an AP with one flex-radio, which operates on dual bands. Further, the third configuration shows an AP with two flex-radios, both of which configured to operate on dual bands.

Although only an example of 2×2 spatial streams is shown above, it is possible that an AP have three or more flex radios. For example, a 4×4 or 8×8 flex radio could be configured as 2×(2×2) or 2×(4×4). In general, a flex radio with 2n×2n spatial-streams could be configured as 2 (n×n) radios.

A mesh network can generally refer to a local network topology in which the infrastructure nodes (e.g., bridges, switches and other infrastructure devices) connect directly, dynamically and non-hierarchically to as many other nodes as possible and cooperate with one another to efficiently route data from/to clients. Mesh networks can dynamically self-organize and self-configure, which can reduce installation overhead. In a mesh network, mesh portals generally refer to nodes that have direct wired connection to a distribution system (e.g., an Ethernet). On the other hand, mesh points generally refer to nodes that connect to the distribution system (e.g., Ethernet) through a mesh portal and a number of other mesh points.

Each AP in a mesh network may serve a plurality of client devices. Thus, there are two types of traffic that are transmitted on the mesh network. The first type of traffic involves control frames transmitted between the managed network device (e.g., access points, controllers, etc.) for network control and management, which is also referred to as backhaul traffic. The connections between two mesh points or a mesh point and a mesh portal that are used to transmit backhaul traffic can be referred to as backhaul connections. The second type of traffic involves data frames transmitted to and from client devices that are associated with the APs in the mesh network.

When APs implement a mesh network topology, the APs often use one wireless communication band (e.g., 5 GHz band) for transmitting wireless backhaul traffic and another wireless communication band (e.g., 2.4 GHz band) for transmitting client data traffic. As mentioned above, such configuration can be inefficient and provides no redundant links in the event of a backhaul link failure. Therefore, examples of the present disclosure illustrate a technique to establish mesh network backhaul connections with flex-radios that provides improved efficiency and redundancy.

Figure 1:
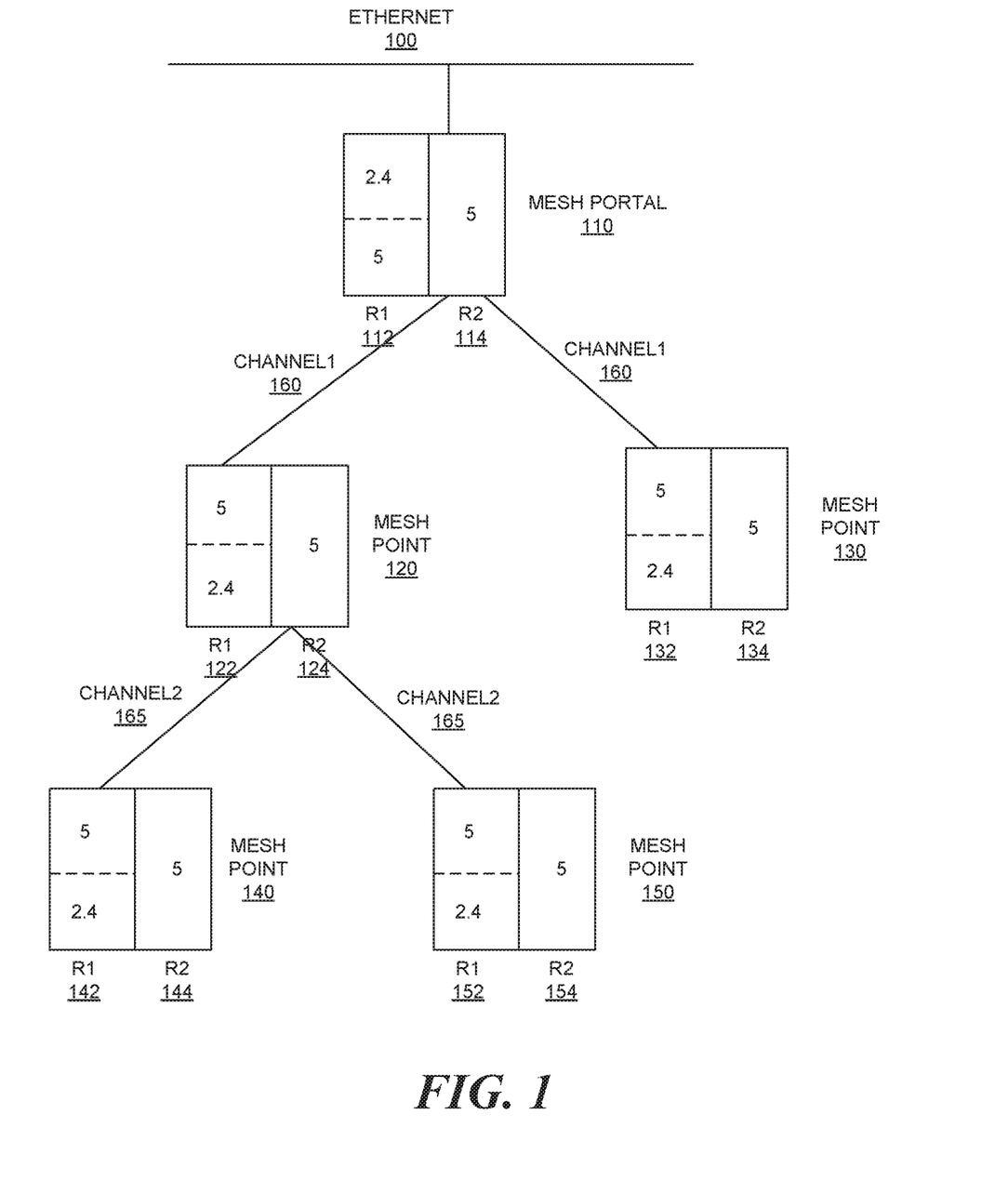
FIG. 1 is a block diagram of an example system for establishing backhaul connection to mesh points and mesh portals on different wireless communication channels.

FIG. 1 is a block diagram of an example system for establishing backhaul connection to mesh points and mesh portals on different wireless communication channels. Specifically, FIG. 1 includes Ethernet 100, a mesh portal 110, and a plurality of mesh points 120, 130, 140, and 150. In this example, each mesh node (e.g., mesh portal or mesh point) can be an access point with two radios, one of which is a flex-radio that can be configured to operate on 2.4 GHz band only, on 5 GHz band only, or on dual bands (e.g., both 2.4 GHz and 5 GHz bands).

As shown in FIG. 1, mesh portal 110 has two radios R1 112 and R2 114, where R1 112 is a flex-radio that operates in the dual mode. When an AP configured as a mesh portal (e.g., mesh portal 110) boots up and joins the mesh network, the AP may choose to operate its R2 radio 114 on a 5 GHz wireless communication channel, and its R1 radio 112 operating on split channels. Thus, while one spatial stream of R1 112 operates on a 2.4 GHz wireless communication channel, the other spatial stream of R1 112 may operate on a 5 GHz wireless communication channel at the same time. As previously mentioned, as a mesh portal 110, the AP has direct connection to Ethernet 100 for transmitting backhaul traffic.

Note that there are a plurality of wireless communication channels in a particular wireless frequency band (e.g., 5 GHz band). The particular choice of wireless communication channel within the wireless frequency band may be determined based on any radio resource management solution, for example, adaptive radio management (ARM) technology. Once mesh portal 110 chooses a particular wireless communication channel, e.g., Channel 1 160, in the 5 GHz band for R2 114 to operate on, mesh portal 110 can send wireless beacons on the particular wireless communication channel (e.g., Channel 1 160). The beacons include information for other APs configured as mesh points to establish a backhaul connection with mesh portal 110 on the particular wireless communication channel (e.g., Channel 1 160).

Next, when a second AP configured in a mesh point role (e.g., mesh point 120) boots up and joins the mesh network, the AP may scan for existing mesh portals and/or mesh points on its R1 radio 122, which is a flex radio. Similar to the AP corresponding to mesh portal 110, the second AP corresponding to mesh point 120 also has two radios, namely R1 122 and R2 124, where its R1 radio 122 operates in the dual mode on both a 2.4 GHz channel and a 5 GHz channel (e.g., Channel 1 160).

R1 122 of mesh point 120 may detect from the channel scan a number of mesh portals and/or mesh points that it could establish a backhaul connection with. The criteria with which a mesh point 120 selects the radio to establish a mesh link for transmitting backhaul traffic can be based on any metrics. For example, signal-to-noise ratio (SNR), the number of hops to the mesh portal, etc., can be used for determining the next hop uplink mesh AP. In this example, assuming that R1 122 of mesh point 120 selects to establish a backhaul connection to R2 114 of mesh portal 110 on the particular wireless communication channel, e.g., Channel 1 160.

After the backhaul connection is established between mesh point 120 and mesh portal 110, mesh point 120 can select a second 5 GHz wireless communication channel on its R2 Radio 124 in 5 GHz band. The second 5 GHz wireless communication channel, e.g., Channel 2 165, is different from the first 5 GHz wireless communication channel, e.g., Channel 1 160. More specifically, Channel 1 160 and Channel 2 165 are non-overlapping and non-interfering channels on the same wireless frequency band. Thus, mesh point 120 can simultaneously transmit uplink backhaul traffic to mesh portal 110 on Channel 1 160 and downlink backhaul traffic to other mesh points on Channel 2 165 at a high throughput and a high quality of transmission without inter-radio interference. Additional considerations may be taken into account to select the second 5 GHz wireless communication channel for R2 124 of mesh point 120. For example, the second 5 GHz wireless communication channel may be chosen using any radio resource management solution (e.g., ARM). In some examples, dual 5 Ghz operation of the flex radio R2 124 involve configuring one 5 GHz radio to be operating in the upper band (e.g. channel 100 to channel 165) and the other 5 GHz radio to be operating in the lower band (e.g. channel 36 to channel 65). In some examples, radio channel assignment may be determined by AirMatch technology, which can intelligently pair the radios based on AP's radio capabilities, client devices' radio capabilities, various network conditions and health metrics, etc. In some examples, the second 5 GHz wireless communication channel is chosen such that the AP can provide maximum radio frequency (RF) coverage while reducing interference with other APs that operate on the same channel.

Following the same mechanism, other mesh points can be connected to the mesh network similarly. In the example illustrated in FIG. 1, mesh point 130 has two radios R1 132 and R2 134, where R1 132 is a flex radio operating in dual mode and R2 134 is a radio operating on a 5 GHz wireless communication channel. Specifically, R1 132 operates on Channel 1 160 (e.g. channel 149) in the 5 GHz band and a channel in 2.4 GHz at the same time. After scanning for other mesh portals and mesh points operating on Channel 1 160, R1 132 chooses to establish a backhaul connection with R2 114 of mesh portal 110 on Channel 1 160.

Likewise, mesh point 140 has two radios R1 142 and R2 144, where R1 142 is a flex radio operating in dual mode and R2 144 is a radio operating on a 5 GHz wireless communication channel. Specifically, R1 142 operates on Channel 2 165 in the 5 GHz band. After scanning for other mesh portals and mesh points operating on Channel 2 165 (e.g., channel 52), R1 12 chooses to establish a backhaul connection with R2 124 of mesh point 120 on Channel 2 165. Also, mesh point 140 may select a third 5 GHz wireless communication channel for R2 144 to operate on. The third channel shall be non-overlapping and non-interfering with Channel 2 165. Mesh point 140 can advertise its beacon on the third channel, such that other mesh points can establish a backhaul connection to R2 144 on the third channel. In some examples, the third channel would be in the same 5 GHz unlicensed spectrum (UNII) block as the first channel selected by the uplink radio R1 122 of the upstream AP (e.g., mesh point 120). For example, the third channel could be channel 157.

In addition, mesh point 150 also has two radios R1 152 and R2 154, where R1 152 is a flex radio operating in dual mode and R2 154 is a radio operating on a 5 GHz wireless communication channel. Specifically, R1 152 operates on Channel 2 165 in the 5 GHz band and a 2.4 GHz wireless band. After scanning for other mesh portals and mesh points operating on Channel 2 165, R1 152 chooses to establish a backhaul connection with R2 124 of mesh point 120 on Channel 2 165. Also, mesh point 150 may select a fourth 5 GHz wireless communication channel for R1 154 to operate on. The fourth channel shall be non-overlapping and non-interfering with Channel 2 165. Thereafter, mesh point 150 can advertise its beacon on the fourth channel on the 5 GHz band, such that other mesh points can establish a backhaul connection to R2 152 on the fourth channel. In some examples, the fourth channel may be in the same 5 GHz unlicensed spectrum (UN II) block as the first channel selected by the uplink radio R1 122 of the upstream AP (e.g., mesh point 120). For example, the fourth channel may be channel 165. In some examples, the fourth channel may be in the same UNII block as the same as the downlink channel selected by a peer mesh point (e.g., the third channel selected for downlink by R2 144 of mesh point 140) that share the same upstream AP with mesh point 150. In some examples, the fourth channel is a different channel from the first channel, the second channel, and the third channel.

In this solution, the wireless client devices can be serviced on all of the possible radios (R1 and R2) of mesh points and/or mesh portals in the mesh network. Therefore, the solution increases the throughput of the network, esp. the backhaul traffic can be transmitted more efficiently compared to a single backhaul channel shared by all mesh points and mesh portals.

Figure 2:
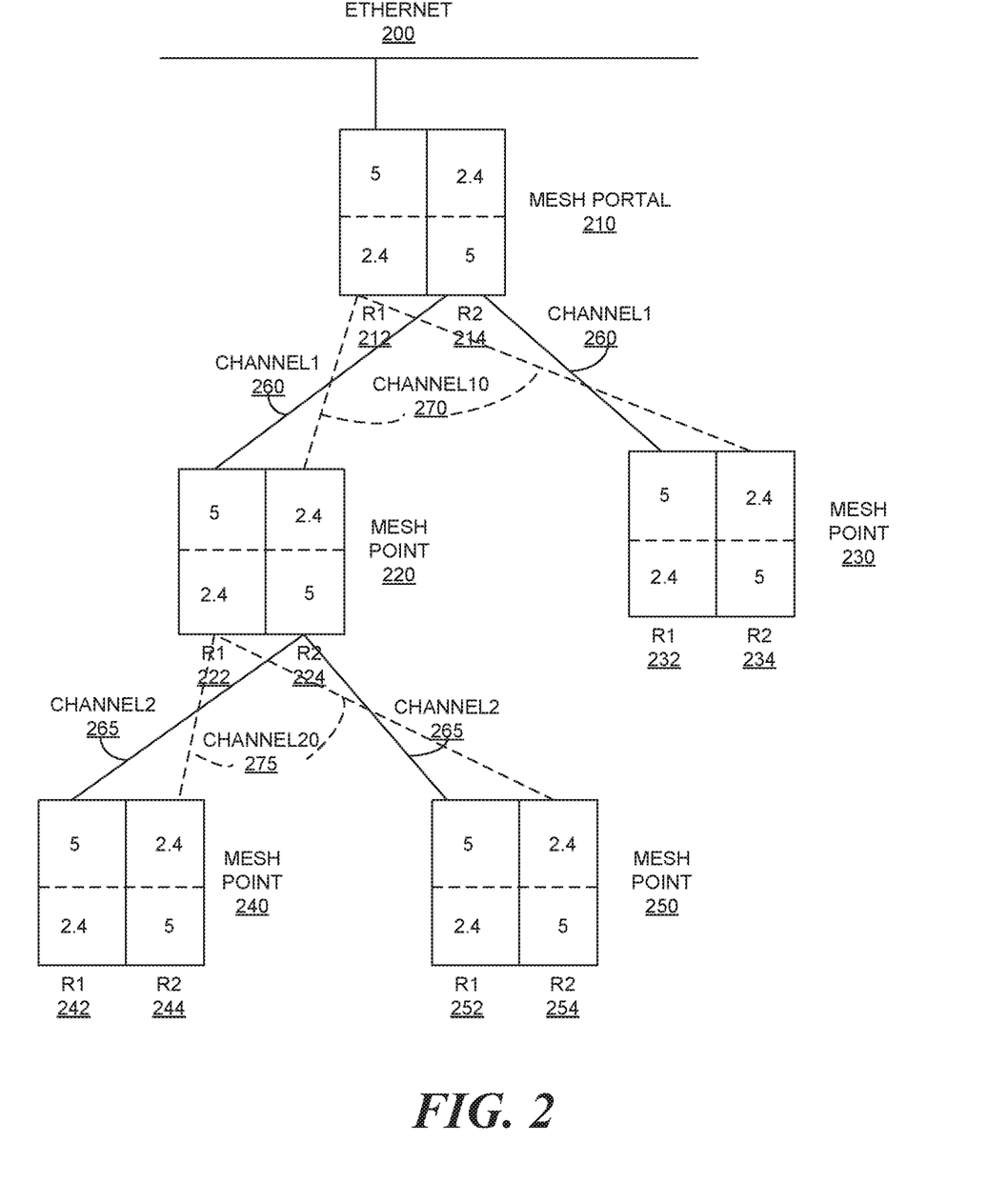
FIG. 2 is a block diagram of an example system for establishing backhaul connection to mesh points and mesh portals on different wireless communication channels.

FIG. 2 is another block diagram of an example system for establishing backhaul connection to mesh points and mesh portals on different wireless communication channels. Specifically, FIG. 1 includes Ethernet 200, a mesh portal 210, and a plurality of mesh points 220, 230, 240, and 250. In this example, each mesh node (e.g., mesh portal or mesh point) can be an access point with two flex-radios, either of which can be configured to operate on both 2.4 GHz and 5 GHz bands.

As shown in FIG. 2, mesh portal 210 has two radios R1 212 and R2 214, both of which are flex-radios operating in the dual mode. As a mesh portal 210, the AP has direct connection to Ethernet 200 for transmitting traffic out of the mesh network. When an AP configured as a mesh portal (e.g., mesh portal 210) boots up and joins the mesh network, the AP may choose to transmit its downlink traffic on the 5 GHz channel of its R2 radio 214 and on the 2.4 GHz channel of its R1 radio 212. Thus, it is possible for the 2.4 GHz channel to be configured as a backup backhaul connection between mesh portal 210 and its downlink mesh points.

Once mesh portal 210 chooses, using technologies like ARM, a particular wireless communication channel, e.g., Channel 1 260, in the 5 GHz band for R2 214 to operate on, mesh portal 210 can send wireless beacons on the particular wireless communication channel (e.g., Channel 1 260). The beacons include information for other APs configured as mesh points to establish a backhaul connection with mesh portal 210 on the particular wireless communication channel (e.g., Channel 1 260).

Likewise, mesh portal 210 can choose a particular wireless communication channel, e.g., Channel 10 270, in the 2.4 GHz band for R1 212 to operate on. Then, mesh portal 210 can send wireless beacons on the particular wireless communication channel (e.g., Channel 10 270). The beacons include information for other APs configured as mesh points to establish a backhaul connection with mesh portal 210 on the particular wireless communication channel (e.g., Channel 10 270). In some examples, backhaul links on Channel 10 270 can act as backup connections for backhaul links on Channel 1 260. In some examples, mesh portal 210 can balance downlink traffic across both R1 212 via backhaul links on Channel 10 270 and R2 214 via backhaul links on Channel 1 260.

Next, when a second AP configured in a mesh point role (e.g., mesh point 220) boots up and joins the mesh network, the AP may scan for existing mesh portals and/or mesh points on its R1 radio 222 and R2 224, both of which are flex radios, similar to the AP corresponding to mesh portal 210.

R1 222 of mesh point 220 may detect from its channel scanning process a number of mesh portals and/or mesh points that it could establish a backhaul connection with. The criteria with which a mesh point 220 selects the radio to establish a mesh link for transmitting backhaul traffic can be based on any metrics. For example, signal-to-noise ratio (SNR), the number of hops to the mesh portal, etc., can be used for determining the next hop uplink mesh AP. In this example, assuming that R1 222 of mesh point 220 selects to establish a backhaul connection to R2 214 of mesh portal 210 on the Channel 1 260 in the 5 GHz band. At the same time, R2 224 of mesh point 220 may detect from its channel scanning process a number of mesh portals and/or mesh points that it could establish a backhaul connection with. In this example, assuming that R2 224 of mesh point 220 selects to establish a backhaul connection to R1 212 of mesh portal 210 on the Channel 10 270 in the 2.4 GHz band. In some examples, the backhaul link between R2 224 of mesh point 220 and R1 212 of mesh portal 210 on Channel 10 270 can act as a backup connection for the backhaul link between R1 222 of mesh point 220 and R2 214 of mesh portal 210 on Channel 1 260. In some examples, mesh point 220 can load balance its uplink traffic across both R1 222 via backhaul connection to R2 214 of mesh portal 210 on Channel 1 260, and R2 224 via backhaul connection to R1 212 of mesh portal 210 on Channel 10 270.

After the backhaul connection is established between mesh point 220 and mesh portal 210, mesh point 220 can select a second 5 GHz wireless communication channel for its downlink R2 Radio 224. The second 5 GHz wireless communication channel, e.g., Channel 2 265, is different from the first 5 GHz wireless communication channel, e.g., Channel 1 260. More specifically, Channel 1 260 and Channel 2 265 are non-overlapping and non-interfering channels on the same wireless frequency band. Thus, mesh point 220 can simultaneously transmit uplink backhaul traffic to mesh portal 210 on Channel 1 260 and Channel 10 270, and downlink backhaul traffic to other mesh points on Channel 2 265 and Channel 20 275 at a high throughput and a high quality of transmission without inter-radio interference.

Moreover, other mesh points can be connected to the mesh network in a similar fashion. For example, mesh point 230 has two flex-radios R1 232 and R2 234, both of which configured to operate in dual mode on both a 2.4 GHz channel and a 5 GHz channel. After scanning for other mesh portals and mesh points operating on Channel 1 260, R1 232 may choose to establish a backhaul connection with R2 214 of mesh portal 210 on Channel 1 260 in the 5 GHz band; whereas R2 234 may choose to establish a backhaul connection with R1 212 of mesh portal 210 on Channel 10 270 in the 2.4 GHz band. In some examples, the backhaul link between R2 234 of mesh point 230 and R1 212 of mesh portal 210 on Channel 10 270 can act as a backup connection for the backhaul link between R1 232 of mesh point 230 and R2 214 of mesh portal 210 on Channel 1 260. In some examples, mesh point 230 can load balance its uplink traffic across both R1 232 via backhaul connection to R2 214 of mesh portal 210 on Channel 1 260, and R2 234 via backhaul connection to R1 212 of mesh portal 210 on Channel 10 270.

Likewise, mesh point 240 has two radios R1 242 and R2 244, both of which are flex radios operating in dual mode on a 2.4 GHz channel and a 5 GHz channel. Specifically, R1 242 may transmit uplink traffic on Channel 2 265 in the 5 GHz band and R2 244 may transmit uplink traffic on Channel 20 275 in the 2.4 GHz band. After scanning for other mesh portals and mesh points operating on Channel 2

265, R1 242 may choose to establish a backhaul connection with R2 224 of mesh point 220 on Channel 2 265. In addition, R2 244 may choose to establish a backhaul connection with R1 222 of mesh point 220 on Channel 20 275. Also, mesh point 240 may select a third 5 GHz wireless communication channel for R2 244 to transmit downlink traffic, and a third 2.4 GHz wireless communication channel for R1 242 to transmit downlink traffic. The third 5 GHz channel shall be non-overlapping and non-interfering with Channel 2 265, and the third 2.4 GHz channel shall be non-overlapping and non-interfering with Channel 20 275. Mesh point 240 can advertise its beacons on both the third 5 GHz channel and the third 2.4 GHz channel, such that other mesh points can establish a backhaul connection to either R1 242 on the third 2.4 GHz channel or R2 244 on the third 5 GHz channel. In some examples, it is possible that the third channels are the same as the first channels selected by the corresponding uplink radios of the upstream AP (e.g., mesh point 220).

In addition, mesh point 250 also has two flex radios R1 252 and R2 254, both of which are flex radios operating in dual mode on both a 2.4 GHz channel and a 5 GHz channel. Specifically, R1 252 operates on Channel 2 265 in the 5 GHz band to transmit uplink traffic and R2 254 operates on Channel 20 275 in the 2.4 GHz band to transmit uplink traffic. After scanning for other mesh portals and mesh points operating on Channel 2 265, R1 252 may choose to establish a backhaul connection with R2 224 of mesh point 220 on Channel 2 265, whereas R2 254 may choose to establish a backhaul connection with R1 222 of mesh point 220 on Channel 20 275. Also, mesh point 250 may select a fourth 5 GHz wireless communication channel for R2 254 to transmit downlink traffic and a fourth 2.4 GHz wireless communication channel for R1 252 to transmit downlink traffic. The fourth 5 GHz channel shall be non-overlapping and non-interfering with Channel 2 265, and the fourth 2.4 GHz channel shall be non-overlapping and non-interfering with Channel 20 275. Thereafter, mesh point 250 can advertise its beacons on both the fourth 5 GHz channel and the fourth 2.4 GHz channel, such that other mesh points can establish a backhaul connection to either R1 252 on the fourth 2.4 GHz channel or R2 254 on the fourth 5 GHz channel. In some examples, the fourth channels may be the same as the first channels selected by the corresponding uplink radio of the upstream AP (e.g., mesh point 220). In some examples, the fourth channels may be the same as the downlink channel selected by a peer mesh point (e.g., the corresponding third channels selected for downlink by R1 242 or R2 244 of mesh point 240) that share the same upstream AP with mesh point 250. In some examples, the fourth channels are different channels from the first channels, the second channels, and the third channels in the respective frequency bands.

In this solution, the wireless client devices can be serviced on all of the possible radios (R1 and R2) of mesh points and/or mesh portals in the mesh network. Therefore, the solution increases the throughput of the network, esp. the backhaul traffic can be transmitted more efficiently compared to a single backhaul channel shared by all mesh points and mesh portals.

As used herein, "network device" generally includes a device that is adapted to transmit and/or receive signaling and to process information within such signaling such as a station (e.g., any data processing equipment such as a computer, cellular phone, personal digital assistant, tablet devices, etc.), an access point, data transfer devices (such as network switches, routers, controllers, etc.) or the like. For example, a "network device may refer to a network controller that comprises a hardware or a combination of hardware and software that enables connection between client devices and computer networks. In some implementations, a network device may refer to a server computing device (e.g., on-premise server, private, public, or hybrid cloud server) that comprises a hardware or a combination of hardware and software that can process and/or display network-related information. In some implementations, a network device may refer to an access point acting as a virtual master network controller among a cluster of access points.

As used herein, 'access point' (AP) generally refers to receiving points for any known or convenient wireless access technology which may later become known. Specifically, the term AP is not intended to be limited to IEEE 802.11-based APs. APs generally function as an electronic device that is adapted to allow wireless devices to connect to a wired network via various communications standards.

Figure 3:
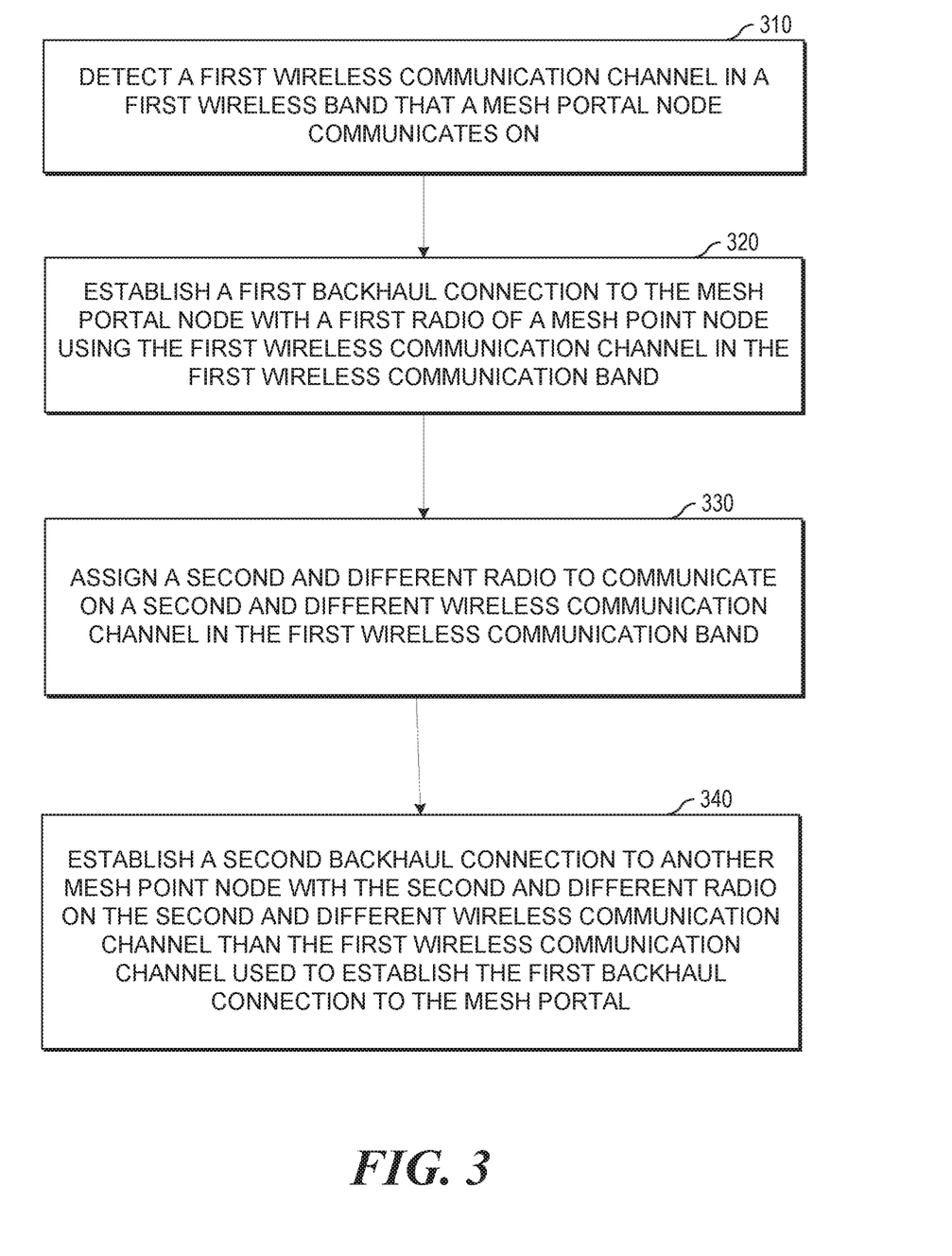
FIG. 3 is a flowchart of an example process of establishing backhaul connection to mesh points and mesh portals on different wireless communication channels.

Processes of Establishing Backhaul Connection to Mesh Points and Mesh Portals on Different Wireless Communication Channels FIG. 3 is a flowchart of an example process of establishing backhaul connection to mesh points and mesh portals on different wireless communication channels. During operations, a network device (e.g., an AP) may detect a first wireless communication channel in a first wireless band that a mesh portal node communicates on (operation 310). Then, the network device may establish a first backhaul connection to the mesh portal node with a first radio of a mesh point node using the first wireless communication channel in the first wireless frequency band (operation 320). Next, the network device may assign a second and different radio to communicate on a second and different wireless communication channel in the first wireless frequency band (operation 330). Further, the network device may establish a second backhaul connection to another mesh point node with the second and radio on the second wireless communication channel (operation 340).

In some examples, the first radio of the mesh point node may include a flex radio operating in a dual mode on both the first wireless frequency band and the second wireless frequency band. In some examples, the second radio of the mesh point node may also include a flex radio operating in the dual mode.

In some examples, the network device may detect a third wireless communication channel in a second wireless band that a mesh portal node communicates on. Then, the network device may establish a third backhaul connection to the mesh portal node with the second radio of the mesh point node using the third wireless communication channel in the second wireless frequency band. Furthermore, the network device may assign the first radio to communicate on a fourth wireless communication channel in the second wireless frequency band. In addition, the network device may establish a fourth backhaul connection to the other mesh point node with the first radio on the fourth wireless communication channel in the second wireless frequency band, wherein the fourth wireless communication channel is different than the third wireless communication channel used to establish the third backhaul connection to the mesh portal.

In some examples, the third backhaul connection may be a backup connection for the first backhaul connection between the network device and the mesh portal node. Further, the fourth backhaul connection may be a backup connection for the second backhaul connection between the network device and the other mesh point node.

In some examples, the network device can balance uplink backhaul traffic across both (1) the first backhaul connection over the first wireless communication channel in the first wireless frequency band, and (2) the third backhaul connection over the third wireless communication channel in the second wireless frequency band between the network device and the mesh portal node.

In some examples, the network device can balance downlink backhaul traffic across both (1) the second backhaul connection over the second wireless communication channel in the first wireless frequency band, and (2) the fourth backhaul connection over the fourth wireless communication channel in the second wireless frequency band between the network device and the other mesh point node.

In some examples, the first wireless communication channel and the second communication channel are non-overlapping and non-interfering channels in the first wireless frequency band, thereby reducing inter-radio interference.

In some examples, the first wireless communication channel is on upper band of the first wireless frequency band, and wherein the second wireless communication channel is on the lower band of the first wireless frequency band.

Figure 4:
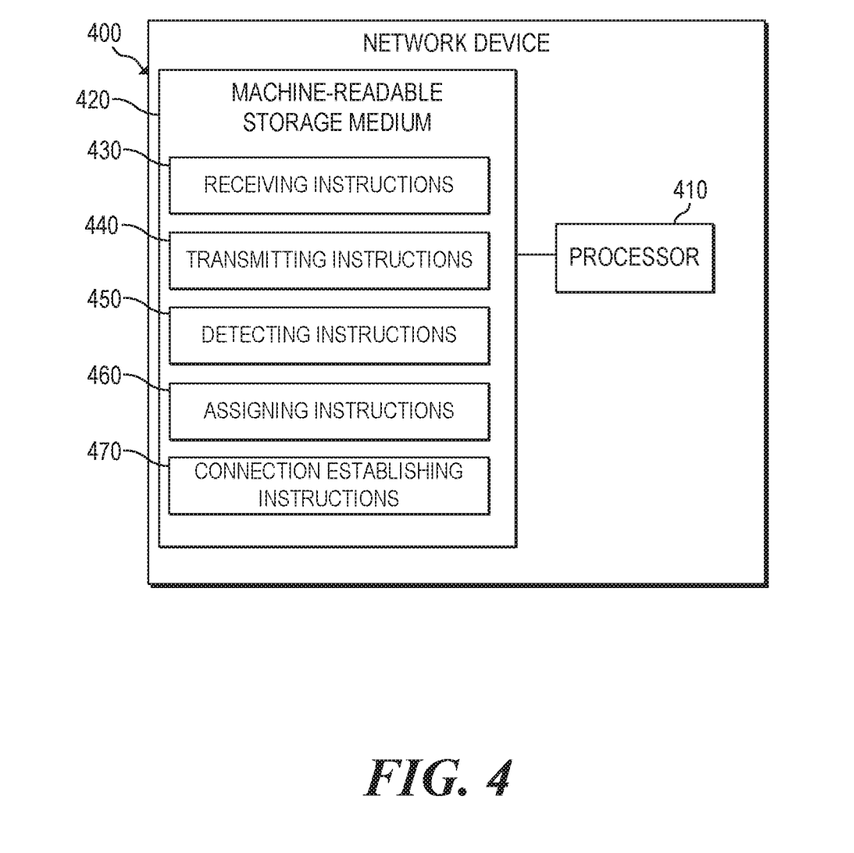
FIG. 4 is a block diagram of an example network device to establish backhaul connection to mesh points and mesh portals on different wireless communication channels.

Network Device to Establish Backhaul Connection to Mesh Points and Mesh Portals on Different Wireless Communication Channels FIG. 4 is a block diagram of an example network device to establish backhaul connection to mesh points and mesh portals on different wireless communication channels.

As used herein, a network device may be implemented, at least in part, by a combination of hardware and programming. For example, the hardware may comprise at least one processor (e.g., processor 410) and the programming may comprise instructions, executable by the processor(s), stored on at least one machine-readable storage medium (e.g., 420). In addition, a network device may also include embedded memory and a software that can be executed in a host system and serve as a driver of the embedded memory. As used herein, a "processor" may be at least one of a central processing unit (CPU), a semiconductor-based microprocessor, a graphics processing unit (GPU), a field-programmable gate array (FPGA) configured to retrieve and execute instructions, other electronic circuitry suitable for the retrieval and execution instructions stored on a machine-readable storage medium, or a combination thereof.

The at least one processor 410 may fetch, decode, and execute instructions stored on storage medium 420 to perform the functionalities described below in relation to receiving instructions 430, transmitting instructions 440, detecting instructions 450, assigning instructions 460, and connection establishing instructions 470. In other examples, the functionalities of any of the instructions of storage medium 420 may be implemented in the form of electronic circuitry, in the form of executable instructions encoded on a machine-readable storage medium, or a combination thereof. The storage medium may be located either in the computing device executing the machine-readable instructions, or remote from but accessible to the computing device (e.g., via a computer network) for execution. In the example of FIG. 4, storage medium 420 may be implemented by one machine-readable storage medium, or multiple machine-readable storage media.

Although network device 400 includes at least one processor 410 and machine-readable storage medium 420, it may also include other suitable components, such as additional processing component(s) (e.g., processor(s), ASIC(s), etc.), storage (e.g., storage drive(s), etc.), or a combination thereof.

As used herein, a "machine-readable storage medium" may be any electronic, magnetic, optical, or other physical storage apparatus to contain or store information such as executable instructions, data, and the like. For example, any machine-readable storage medium described herein may be any of Random Access Memory (RAM), volatile memory, non-volatile memory, flash memory, a storage drive (e.g., a hard drive), a solid state drive, any type of storage disc (e.g., a compact disc, a DVD, etc.), and the like, or a combination thereof. Further, any machine-readable storage medium described herein may be non-transitory. In examples described herein, a machine-readable storage medium or media may be part of an article (or article of manufacture). An article or article of manufacture may refer to any manufactured single component or multiple components.

Specifically, instructions 430-470 may be executed by processor 410 to: detect a first wireless communication channel in a first wireless band that a mesh portal node communicates on; establish a first backhaul connection to the mesh portal node with a first radio of a mesh point node using the first wireless communication channel in the first wireless frequency band; assign a second and different radio to communicate on a second and different wireless communication channel in the first wireless frequency band; establish a second backhaul connection to another mesh point node with the second and radio on the second wireless communication channel; detect a third wireless communication channel in a second wireless band that a mesh portal node communicates on; establish a third backhaul connection to the mesh portal node with the second radio of the mesh point node using the third wireless communication channel in the second wireless frequency band; assign the first radio to communicate on a fourth wireless communication channel in the second wireless frequency band; establish a fourth backhaul connection to the other mesh point node with the first radio on the fourth wireless communication channel in the second wireless frequency band, wherein the fourth wireless communication channel is different than the third wireless communication channel used to establish the third backhaul connection to the mesh portal; etc.

We claim:

1. A method comprising:
   detecting, by a network device, a first wireless communication channel in a first wireless frequency band that a mesh portal node communicates on;
   establishing, by the network device, a first backhaul connection to the mesh portal node with a first radio of a mesh point node using the first wireless communication channel in the first wireless frequency band;
   assigning, by the network device, a second and different radio of the mesh point node to communicate on a second and different wireless communication channel in the first wireless frequency band; and
   establishing, by the network device, a second backhaul connection to another mesh point node with the second and different radio of the mesh point node on the second wireless communication channel;
   detecting, by the network device, a third wireless communication channel in a second wireless band that a mesh portal node communicates on;
   establishing, by the network device, a third backhaul connection to the mesh portal node with the second radio of the mesh point node using the third wireless communication channel in the second wireless frequency band;

assigning, by the network device, the first radio to communicate on a fourth wireless communication channel in the second wireless frequency band; and establishing, by the network device, a fourth backhaul connection to the another mesh point node with the first radio on the fourth wireless communication channel in the second wireless frequency band, wherein the fourth wireless communication channel is different than the third wireless communication channel used to establish the third backhaul connection to the mesh portal.

2. The method of claim 1, wherein the first radio of the mesh point node comprises a flex radio operating in a dual mode on both the first wireless frequency band and the second wireless frequency band.

3. The method of claim 2, wherein the second radio of the mesh point node comprises the flex radio operating in the dual mode.

4. The method of claim 1, wherein the third backhaul connection is a backup connection for the first backhaul connection between the network device and the mesh portal node.

5. The method of claim 1, wherein the fourth backhaul connection is a backup connection for the second backhaul connection between the network device and the other mesh point node.

6. The method of claim 1, wherein the network device balances uplink backhaul traffic across both (1) the first backhaul connection over the first wireless communication channel in the first wireless frequency band, and (2) the third backhaul connection over the third wireless communication channel in the second wireless frequency band between the network device and the mesh portal node.

7. The method of claim 1, wherein the network device balances downlink backhaul traffic across both (1) the second backhaul connection over the second wireless communication channel in the first wireless frequency band, and (2) the fourth backhaul connection over the fourth wireless communication channel in the second wireless frequency band between the network device and the other mesh point node.

8. The method of claim 1, wherein the first wireless communication channel and the second communication channel are non-overlapping and non-interfering channels in the first wireless frequency band, thereby reducing inter-radio interference.

9. The method of claim 1, wherein the first wireless communication channel is on upper band of the first wireless frequency band, and wherein the second wireless communication channel is on the lower band of the first wireless frequency band.

10. A network device, comprising at least:
a memory;
a processor executing instructions from the memory to:
detect a first wireless communication channel in a first wireless frequency band that a mesh portal node communicates on;
establish a first backhaul connection to the mesh portal node with a first radio of a mesh point node using the first wireless communication channel in the first wireless frequency band;
assign a second and different radio of the mesh point node to communicate on a second and different wireless communication channel in the first wireless frequency band;

establish a second backhaul connection to another mesh point node with the second and different radio of the mesh point node on the second wireless communication channel;

detect a third wireless communication channel in a second wireless band that a mesh portal node communicates on;

establish a third backhaul connection to the mesh portal node with the second radio of the mesh point node using the third wireless communication channel in the second wireless frequency band;

assign the first radio to communicate on a fourth wireless communication channel in the second wireless frequency band; and establish a fourth backhaul connection to the another mesh point node with the first radio on the fourth wireless communication channel in the second wireless frequency band, wherein the fourth wireless communication channel is different than the third wireless communication channel used to establish the third backhaul connection to the mesh portal.

11. The network device of claim 10, wherein the first radio of the mesh point node comprises a flex radio operating in a dual mode on both the first wireless frequency band and the second wireless frequency band.

12. The network device of claim 11, wherein the second radio of the mesh point node comprises the flex radio operating in the dual mode.

13. The network device of claim 10, wherein the third backhaul connection is a backup connection for the first backhaul connection between the network device and the mesh portal node, and wherein the fourth backhaul connection is a backup connection for the second backhaul connection between the network device and the other mesh point node.

14. The network device of claim 10,
wherein the network device balances uplink backhaul traffic across both (1) the first backhaul connection over the first wireless communication channel in the first wireless frequency band, and (2) the third backhaul connection over the third wireless communication channel in the second wireless frequency band between the network device and the mesh portal node; and
wherein the network device balances downlink backhaul traffic across both (1) the second backhaul connection over the second wireless communication channel in the first wireless frequency band, and (2) the fourth backhaul connection over the fourth wireless communication channel in the second wireless frequency band between the network device and the other mesh point node.

15. The network device of claim 10,
wherein the first wireless communication channel and the second communication channel are non-overlapping and non-interfering channels in the first wireless frequency band, thereby reducing inter-radio interference; and
wherein the third wireless communication channel and the fourth communication channel are non-overlapping and non-interfering channels in the second wireless frequency band, thereby reducing inter-radio interference.

16. A non-transitory machine-readable storage medium encoded with instructions executable by at least one processor of a network device, the machine-readable storage medium comprising instructions to:

detect a first wireless communication channel in a first wireless frequency band that a mesh portal node communicates on;

establish a first backhaul connection to the mesh portal node with a first radio of a mesh point node using the first wireless communication channel in the first wireless frequency band;

assign a second and different radio of the mesh point node to communicate on a second and different wireless communication channel in the first wireless frequency band;

establish a second backhaul connection to another mesh point node with the second and different radio of the mesh point node on the second wireless communication channel;

detect a third wireless communication channel in a second wireless band that a mesh portal node communicates on;

establish a third backhaul connection to the mesh portal node with the second radio of the mesh point node using the third wireless communication channel in the second wireless frequency band;

assign the first radio to communicate on a fourth wireless communication channel in the second wireless frequency band; and establish a fourth backhaul connection to the another mesh point node with the first radio on the fourth wireless communication channel in the second wireless frequency band, wherein the fourth wireless communication channel is different than the third wireless communication channel used to establish the third backhaul connection to the mesh portal.

17. The non-transitory machine-readable storage medium of claim 16, wherein the first radio of the mesh point node comprises a flex radio operating in a dual mode on both the first wireless frequency band and the second wireless frequency band; and wherein the second radio of the mesh point node comprises the flex radio operating in the dual mode.

\* \* \* \* \*